United States Patent
Jang et al.

(10) Patent No.: US 7,453,656 B2
(45) Date of Patent: Nov. 18, 2008

(54) RECORDING AND/OR REPRODUCING APPARATUS WITH AN OPTICAL PICKUP ACTUATOR HAVING HIGH THRUST

(75) Inventors: Dae-jong Jang, Ulwang-si (KR); Byung-youn Song, Suwon-si (KR); Young-bin Lee, Suwon-si (KR); Byung-ryul Ryoo, Suwon-si (KR); Pyong-yong Seong, Seoul (KR); Young-won Lee, Suwon-si (KR)

(73) Assignee: Toshiba Samsung Storage Technology Korea Corporation, Suwon-Si (KR)

( * ) Notice: Subject to any disclaimer, the term of this patent is extended or adjusted under 35 U.S.C. 154(b) by 309 days.

(21) Appl. No.: 11/385,739

(22) Filed: Mar. 22, 2006

(65) Prior Publication Data
US 2006/0218569 A1 Sep. 28, 2006

(30) Foreign Application Priority Data
Mar. 25, 2005 (KR) ...................... 10-2005-0024956

(51) Int. Cl.
*G02B 7/02* (2006.01)
(52) U.S. Cl. .................... 359/819; 359/813; 359/823
(58) Field of Classification Search ......... 359/811–814, 359/819–824; 369/44.14, 44.15, 44.16, 244
See application file for complete search history.

(56) References Cited

U.S. PATENT DOCUMENTS 5,500,771 A * 3/1996 Tomiyama .................. 359/813
6,317,277 B1 * 11/2001 Izumino et al. ............. 359/813
6,574,052 B2 * 6/2003 Suh ............................ 359/814
6,714,364 B2 * 3/2004 Suh ............................ 359/813

FOREIGN PATENT DOCUMENTS

| JP | 2002-140828 | 5/2002 |
| JP | 2004-139642 | 5/2004 |
| JP | 2004-220659 | 8/2004 |
| KR | 2003-0060326 | 7/2003 |
| KR | 2003-0083282 | 10/2003 |
| KR | 10-2004-0016674 | 2/2004 |
| KR | 1020050046109 | 5/2005 |

OTHER PUBLICATIONS

KIPO Office Action Dated Jul. 28, 2006.

* cited by examiner

*Primary Examiner*—Mohammed Hasan
(74) *Attorney, Agent, or Firm*—Staas & Halsey LLP

(57) ABSTRACT

An optical recording and/or reproducing apparatus with an optical pickup actuator having high thrust. The optical pickup actuator may include a lens holder which holds an objective lens and is movably supported by a supporting unit, and a magnetic driving unit which drives the lens holder in a focusing direction, a tracking direction, and/or a tilting direction. The magnetic driving unit includes a surface-triple pole magnet portion and a coil portion. The surface-triple pole magnet portion has a plurality of polarized, i.e., differently magnetized, areas formed by facing sides of two magnets among three magnets. The coil portion includes tracking coils and tilt coils disposed to interact with the polarized areas of the surface-triple pole magnet portion and a focusing coil disposed to interact with a non-polarized area of the surface-triple pole magnet portion.

22 Claims, 11 Drawing Sheets

RECORDING AND/OR REPRODUCING APPARATUS WITH AN OPTICAL PICKUP ACTUATOR HAVING HIGH THRUST

CROSS-REFERENCE TO RELATED APPLICATIONS

This application claims the priority benefit of Korean Patent Application No. 10-2005-0024956, filed on Mar. 25, 2005, in the Korean Intellectual Property Office, the disclosure of which is incorporated herein in its entirety by reference.

BACKGROUND OF THE INVENTION

1. Field of the Invention

Embodiments of the present invention, at least as discussed herein, relate to a recording and/or reproducing apparatus with an optical pickup actuator having high thrust, and more particularly, to a recording/reproducing apparatus with an optical pickup actuator having high thrust and alternating current (AC) sensitivity suitable for high capacity recording media, such as blue-ray discs (BDs) or HD-DVDs.

2. Description of the Related Art

An optical pickup actuator in an optical recording/reproducing apparatus records and/or reproduces information to/from an optical recording medium, e.g., mounted on a turntable, that is, the recording and/or reproducing can be achieved with an optical disc in a non-contact way while moving over the optical disc along a radial direction thereof, for example. The optical pickup actuator may includes an objective lens and an actuator, With the objective lens focusing light emitted from a light source to form an optical spot on the optical disc. The actuator may control the objective lens in a tracking direction, a focusing direction, and a tilt direction, for example, so that the optical spot can be formed at a precise location on the optical disc.

Figure 1:
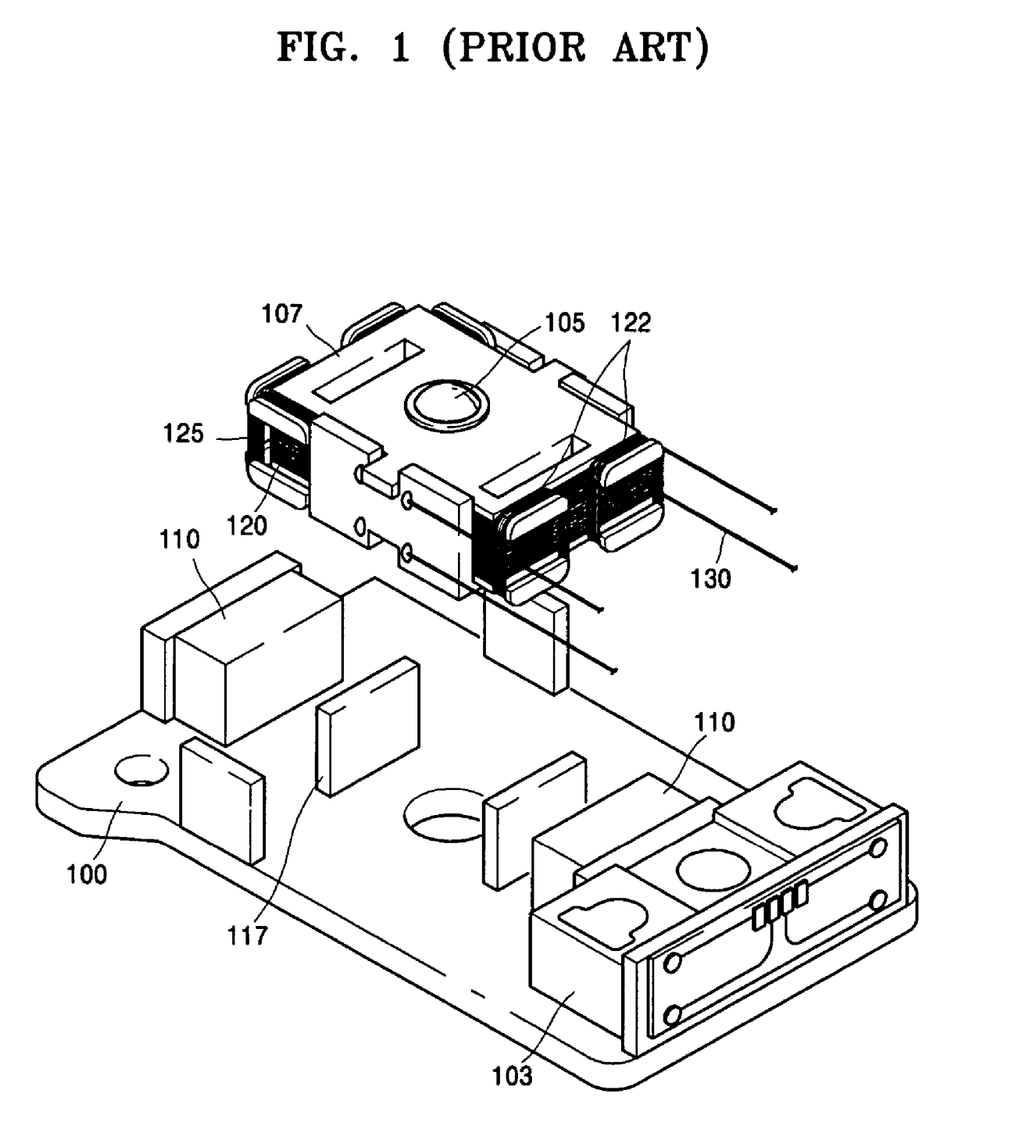
FIG. 1 illustrates a conventional optical pickup actuator in a recording and/or reproducing apparatus.

FIG. 1 illustrates a conventional optical pickup actuator. As shown in FIG. 1, the conventional optical pickup actuator includes a base 100, a holder 103 fixed onto the base 100, a lens holder 107 for fixing an objective lens 105, a plurality of suspension wires 130, connected between the lens holder 107 and the holder 103, to support the lens holder 107 so that the lens holder 107 can move with respect to the holder 103, and a magnetic driving unit for driving the lens holder 107 in a tracking direction, a focusing direction, and/or a tilt direction. The magnetic driving unit includes a magnet 110 installed on the base 100 and a plurality of coils 120, 122, and 125 installed on the lens holder 107. The lens holder 107 may be driven by an electro-magnetic force generated when current is applied to the coils 120, 122, and/or 125 within a magnetic field produced by the magnet 110. The tracking, focusing, and/or tilting performances of the optical pickup actuator depend upon an arrangement of the magnet 110 and the coils 120, 122, and 125. Hence, the arrangement of the magnet 110 and the coils 120, 122, and 125 of the magnetic driving unit is very important in the design of the optical pickup actuator.

Recently, there has been a trend toward developing and utilizing high-capacity recording media, e.g., optical recording media such as blue-ray discs and HD-DVDs, which are capable of storing information of several tens of giga bytes. However, to realize a high-speed recording/reproducing apparatus capable of fast recording information to and/or reproducing information from such high capacity media, a corresponding optical pickup actuator should have an improved AC sensitivity over conventional designs. It has been found that the AC sensitivity of the optical pickup actuator may be improved by reducing the weight of the actuator, by increasing the thrust of the actuator, or by other methods. However, optical pickup actuators for blue-ray discs or HD-DVDs, for example, have an increased number of components compared to the conventional optical pickup actuators for compatibility with existing CDs or DVDs. So, increasing the AC sensitivity by reducing the weight of the optical pickup actuator may not be fruitful. For example, optical pickup actuators for conventional CDs or DVDs may typically weigh about 400 mg, while optical pickup actuators for BDs or HD-DVDs may weigh about 500 mg, which is about 20-30% greater than the weight of the optical pickup actuator for conventional CDs or DVDs. Consequently, to achieve fast recording/reproduction, optical pickup actuators for BDs or HD-DVDs, for example, must have increased thrust, since the option of reducing the weight may be difficult. The magnetic driving unit for such an actuator must, thus, be designed so as to increase the thrust of an optical pickup actuator for high capacity recording media, such as BDs or HD-DVDs.

However, in many cases, when optical pickup actuators for such high capacity recording media are designed, the corresponding magnetic driving units do not generate sufficient strong thrust, or the thrust may be sufficient, but tilting becomes impossible. Similarly, although tilting may be possible, a natural tilt may occur in the optical pickup actuator, or a linearity of the optical pickup actuator may be degraded.

SUMMARY OF THE INVENTION

Accordingly, embodiments of the present invention, at least as discussed herein, set forth a magnetic driving unit capable of driving an optical pickup actuator, e.g., in a recording and/or reproducing apparatus, in a tilting direction with good linearity and with sufficient thrust.

Further, embodiments of the present invention also set forth an optical pickup actuator, e.g., in a recording and/or reproducing apparatus, having a high AC sensitivity suitable for high capacity recording media, such as high-speed blue-ray discs (BDs) or high-speed HD-DVDs, by increasing the thrust of a magnetic driving unit.

To achieve the above and/or other aspects and advantages, embodiments of the present invention include an optical pickup actuator including a lens holder to hold an objective lens, movably supported by a supporting unit, and a magnetic driving unit to drive the lens holder in a focusing direction, a tracking direction, and/or a tilting direction, wherein the magnetic driving unit includes a surface-triple pole magnet including a plurality of differently magnetized areas, formed by facing similarly magnetized sides of each of two respective first and second magnets with a respective differently magnetized side of a third magnet, and a coil portion including tracking coils and tilt coils disposed to interact with the differently magnetized areas of the surface-triple pole magnet portion and a focusing coil disposed to interact with a non-differently magnetized area of the surface-triple pole magnet.

In addition, the surface-triple pole magnet may include the first magnet and the second magnet being disposed in a plane, and the third magnet having surfaces, of a polarity opposite to the polarity of the similarly magnetized sides of the first and second magnets, wherein a first portion of the third magnet is located interposed between the first and second magnets and forms two first differently magnetized areas along sides of the first portion that respectively face the similarly magnetized sides of the first and second magnets, and a second portion of the third magnet faces top sides or bottom sides of the first and second magnets, and forms two second differently magnetized areas along facing sides of the second portion.

The tracking coils may include two tracking coils installed along two lateral sides of the lens holder to interact with the two respective first differently magnetized areas. The tilt coils may include two tilt coils installed along two lateral sides of the lens holder to interact with the two second differently magnetized areas, respectively. Further, a tilt coil may be disposed on a lateral side of the lens holder to interact with one of the two second differently magnetized areas. Here, one second differently magnetized area, which interacts with the tilt coil, may have a different width than another second differently magnetized area.

The focusing coil may be installed on one of an upper portion and a lower portion of the lens holder so as to face the non-differently magnetized area of the third magnet. Here, the focusing coil may be horizontally wound around the lens holder.

The optical pickup actuator may include inner yokes disposed within the lens holder to guide a magnetic flux generated from the third magnet inward of the focusing coil.

In addition, the first, second, and third magnets may be symmetrically installed on opposite sides of the lens holder, the tracking coils are symmetrically installed on corresponding lateral surfaces of the lens holder, and the tilt coils are symmetrically installed on the corresponding lateral surfaces of the lens holder.

To achieve the above and/or other aspects and advantages, embodiments of the present invention include an optical pickup actuator including a lens holder to hold an objective lens, movably supported by a supporting unit, and a magnetic driving unit to drive the lens holder in a focusing direction, a tracking direction, and/or a tilting direction, wherein the magnetic driving unit includes a surface-triple pole magnet including a plurality of differently magnetized areas, formed by facing sides of two magnets among three magnets, and a coil portion including tracking coils and tilt coils disposed to interact with the differently magnetized areas of the surface-triple pole magnet and a focusing coil disposed to interact only with a non-differently magnetized area of the surface-triple pole magnet.

To achieve the above and/or other aspects and advantages, embodiments of the present invention include an optical recording/reproducing apparatus including an optical pickup including an objective lens to focus light emitted from a light source onto a medium and an optical pickup actuator to drive the objective lens, with the optical pickup being movable in a radial direction of the medium to record and/or reproduce information to/from the medium, and a control unit to control servo of the optical pickup, wherein the optical pickup actuator includes a base, a lens holder to hold the objective lens, a supporting unit, having one end coupled to the lens holder and another end coupled to a holder installed on the base, so that the lens holder is moveable over the base, and a magnetic driving unit to drive the lens holder in a focusing direction, a tracking direction, and/or a tilting direction, wherein the magnetic driving unit includes a surface-triple pole magnet including a plurality of differently magnetized areas, formed by facing similarly magnetized sides of each of two respective first and second magnets with a respective differently magnetized side of a third magnet, and a coil portion including tracking coils and tilt coils disposed to interact with the differently magnetized areas of the surface-triple pole magnet portion and a focusing coil disposed to interact with a non-differently magnetized area of the surface-triple pole magnet.

The surface-triple pole magnet may include the first magnet and the second magnet being disposed in a plane, and the third magnet having surfaces, of a polarity opposite to the polarity of the similarly magnetized sides of the first and second magnets, wherein a first portion of the third magnet is located interposed between the first and second magnets and forms two first differently magnetized areas along sides of the first portion that respectively face the similarly magnetized sides of the first and second magnets, and a second portion of the third magnet faces top sides or bottom sides of the first and second magnets, and forms two second differently magnetized areas along facing sides of the second portion.

The tracking coils may include two tracking coils installed along two lateral sides of the lens holder to interact with the two respective first differently magnetized areas. The tilt coils may include two tilt coils installed along two lateral sides of the lens holder to interact with the two second differently magnetized areas, respectively. Further, a tilt coil may be disposed on a lateral side of the lens holder to interact with one of the two second differently magnetized areas.

One second differently magnetized area, which interacts with the tilt coil, may have a different width than another second differently magnetized area.

Further, the focusing coil may be installed on at least one of an upper portion and a lower portion of the lens holder so as to face the non-differently magnetized area of the third magnet.

The focusing coil may further be horizontally wound around the lens holder.

The optical recording/reproducing apparatus may include external yokes vertically installed on the base to fix the first, second, and third magnets, and inner yokes vertically installed within the lens holder on the base to guide a magnetic flux generated from the third magnet inward of the focusing coil.

The tracking coils may be symmetrically installed on opposite lateral surfaces of the lens holder, the tilt coils are symmetrically installed on the corresponding lateral surfaces of the lens holder, and the first, second, and third magnets are symmetrically installed on corresponding sides of the lens holder such as to face the tracking coils and the tilt coils.

To achieve the above and/or other aspects and advantages, embodiments of the present invention include an optical recording/reproducing apparatus including an optical pickup including an objective lens to focus light emitted from a light source onto a medium and an optical pickup actuator to drive the objective lens, with the optical pickup being movable in a radial direction of the medium to record and/or reproduce information to/from the medium, and a control unit to control servo of the optical pickup, wherein the optical pickup actuator includes a base, a lens holder to hold the objective lens, a supporting unit, having one end coupled to the lens holder and another end coupled to a holder installed on the base, so that the lens holder is moveable over the base, and a magnetic driving unit to drive the lens holder in a focusing direction, a tracking direction, and/or a tilting direction, wherein the magnetic driving unit includes a surface-triple pole magnet including a plurality of differently magnetized areas, formed by facing sides of two magnets among three magnets, and a coil portion including tracking coils and tilt coils disposed to interact with the differently magnetized areas of the surface-triple pole magnet and a focusing coil disposed to interact only with a non-differently magnetized area of the surface-triple pole magnet.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4 through 6 illustrate magnetic driving units to be compared with the magnetic driving unit of FIG. 3;

DETAILED DESCRIPTION OF THE PREFERRED EMBODIMENTS

Reference will now be made in detail to embodiments, at least as discussed herein, of the present invention, examples of which are illustrated in the accompanying drawings, wherein like reference numerals refer to the like elements throughout. Embodiments are described below to explain the present invention by referring to the figures.

Figure 2A:
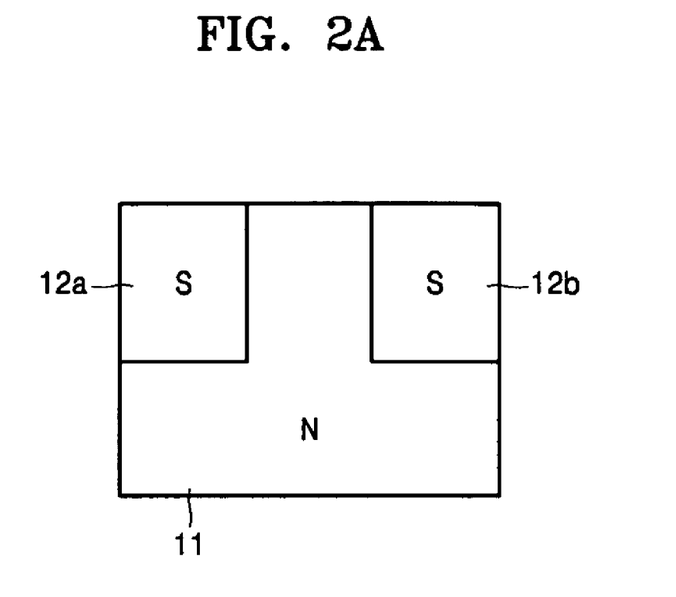
FIGS. 2A and 2B illustrate configurations of magnets and coils, respectively, in a magnetic driving unit in an optical pickup actuator, e.g., in a recording and/or recording apparatus, according to an embodiment of the present invention.
Figure 2B:
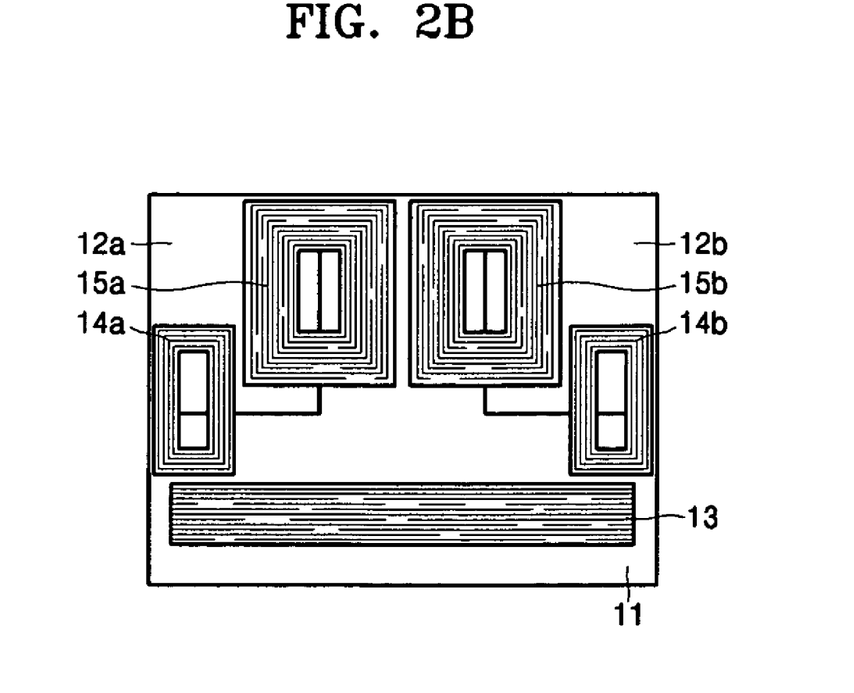

Accordingly, FIGS. 2A and 2B illustrate configurations of magnets and coils, respectively, of a magnetic driving unit in an optical pickup actuator, according to an embodiment of the present invention. As shown in FIG. 2A, a single magnet driving surface of the magnetic driving unit may include a first magnet 12a and a second magnet 12b, disposed parallel to each other, and a third magnet 11 disposed between the first and second magnets 12a and 12b while surrounding bottom sides thereof. The first and second magnets 12a and 12b may have rectangular shapes, and the third magnet 11 may have a convex shape, for example.

Here, the first and second magnets 12a and 12b have the same polarities, while the third magnet 11 has the opposite polarity as the first and second magnets 12a and 12b. For example, as viewed when facing the coils, if the first and second magnets 12a and 12b are S pole magnetized, the third magnet 11 will be N pole magnetized. Conversely, if the first and second magnets 12a and 12b are N pole magnetized, the third magnet 11 will be S pole magnetized. Hence, the singular magnet driving surface of the magnetic driving unit is a surface-triple pole magnet portion formed by having simultaneously magnetized three poles using three facing magnets. With this structure, the portion of the third magnet 11, between the first and second magnets 12a and 12b, may include two first polarized surfaces that face lateral sides of the first and second magnets 12a and 12b, respectively. Further, the portion of the third magnet 11 below the first and second magnets 12a and 12b may include two respective second polarized surfaces that each face bottom sides of the first and second magnets 12a and 12b.

The configuration of coils with respect to the magnet portion of FIG. 2A will now be described in more detail by referring to FIG. 2B. First, a focusing coil 13, according to an embodiment of the present invention, may be disposed so as to interact with a non-polarized area of the surface-triple pole magnet driving surface. That is, the focusing coil 13 may be horizontally disposed to face the portion of the third magnet 11 existing below the first and second magnets 12a and 12b. Two tilt coils 14a and 14b may be vertically disposed to face the two second polarized surfaces, respectively, of the third magnet 11 that face the bottom sides of the first and second magnets 12a and 12b. Two tracking coils 15a and 15b may be vertically disposed to face the two first polarized surfaces, respectively, of the third magnet 11 that face the lateral sides of the first and second magnets 12a and 12b. Hence, the tracking coils 15a and 15b may be located along the upper center of the surface-triple pole magnet driving surface to be symmetrical to each other, the tilt coils 14a and 14b may be located along the edge of the surface-triple pole magnet driving surface to be symmetrical to each other, and the focusing coil 13 may be horizontally disposed along the bottom area of the 3-polarization magnetic driving portion.

Figure 3:
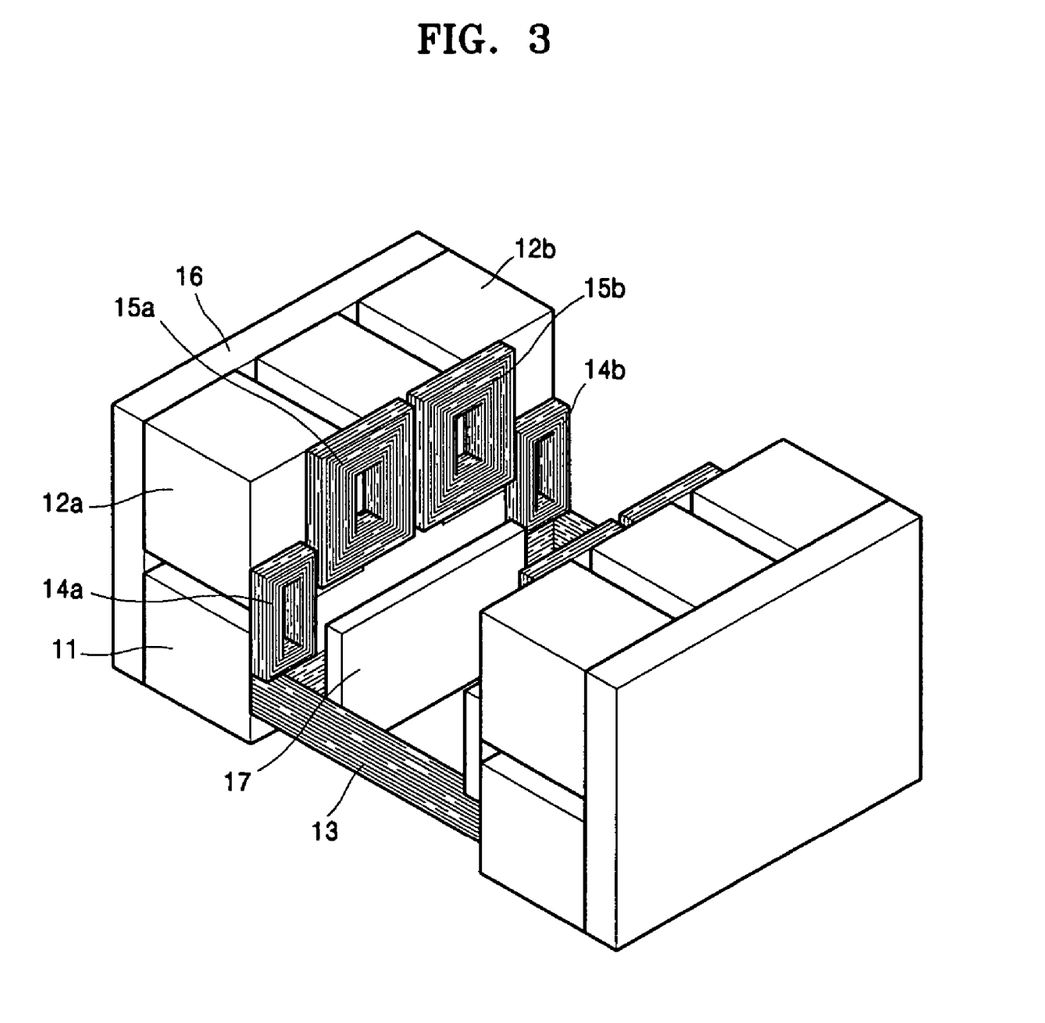
FIG. 3 illustrates a magnetic driving unit according to an embodiment of the present invention, such as with the magnet and coil configurations illustrated in FIGS. 2A and 2B.

FIG. 3 is a perspective view of a schematic structure of a magnetic driving unit using a magnet driving surface, such as that illustrated in FIGS. 2A and 2B. As shown in FIG. 3, two sets of first, second, and third magnets 11, 12a, and 12b may be symmetrically disposed to face each other for driving the lens holder 107, for example. In addition, two sets of tilt coils 14a and 14b and tracking coils 15a and 15b may be symmetrically disposed to interact with the first and second polarized surfaces of the magnet driving surface, formed among the first, second, and third magnets 11, 12a, and 12b. Focusing coils 13 may be horizontally disposed along bottom portions of the two third magnets 11 that face each other. Although a lens holder may be located between the two sets of first, second, and third magnets 11, 12a, and 12b, it is not shown in FIG. 3 merely to facilitate the description of the configuration of magnets and coils. The two sets of tilt coils 14a and 14b and tracking coils 15a and 15b may be installed on two lateral sides of the lens holder that face the two sets of first, second, and third magnets 11, 12a, and 12b. Here, the focusing coil 13 may be horizontally wound around the lower portion of the lens holder, and the first, second, and third magnets 11, 12a, and 12b may be fixed onto an external yoke 16.

Thus, the magnetic driving units illustrated in FIGS. 2A, 2B, and 3 may obtain increased thrust compared to a conventional magnetic driving unit by employing strong magnetic flux generated from two first polarized surfaces of the magnet driving surface, on the aforementioned left and right sides, to perform tracking. In addition, the magnetic driving units illustrated in FIGS. 2A, 2B, and 3 may obtain increased thrust compared to a conventional magnetic driving unit by employing strong magnetic flux generated from two second polarized surfaces of the magnet driving surface, on the aforementioned top and bottom side, to perform tilting. In particular, since the tilt coils 14a and 14b can be disposed on both edges of the lens holder, the magnetic driving units illustrated in FIGS. 2A, 2B, and 3 can obtain a relatively large torque and thus generate high thrust. Furthermore, since the magnetic driving units illustrated in FIGS. 2A, 2B, and 3 drive the lens holder in a focusing direction by using the non-polarized surfaces of the two third magnets 11 that face each other, the magnetic driving units can achieve excellent linear driving compared to a conventional magnetic driving unit. However, due to the use of the non-polarized surfaces, e.g., only the non-polarized surfaces, a thrust in the focusing direction may be insufficient compared with the thrust in the tracking direction. This insufficient thrust in the focusing direction can be compensated for by using internal yokes 17 which may be vertically installed inward the lens holder to guide magnetic fluxes generated from the third magnets 11 inward the focusing coil 13.

Figure 4:
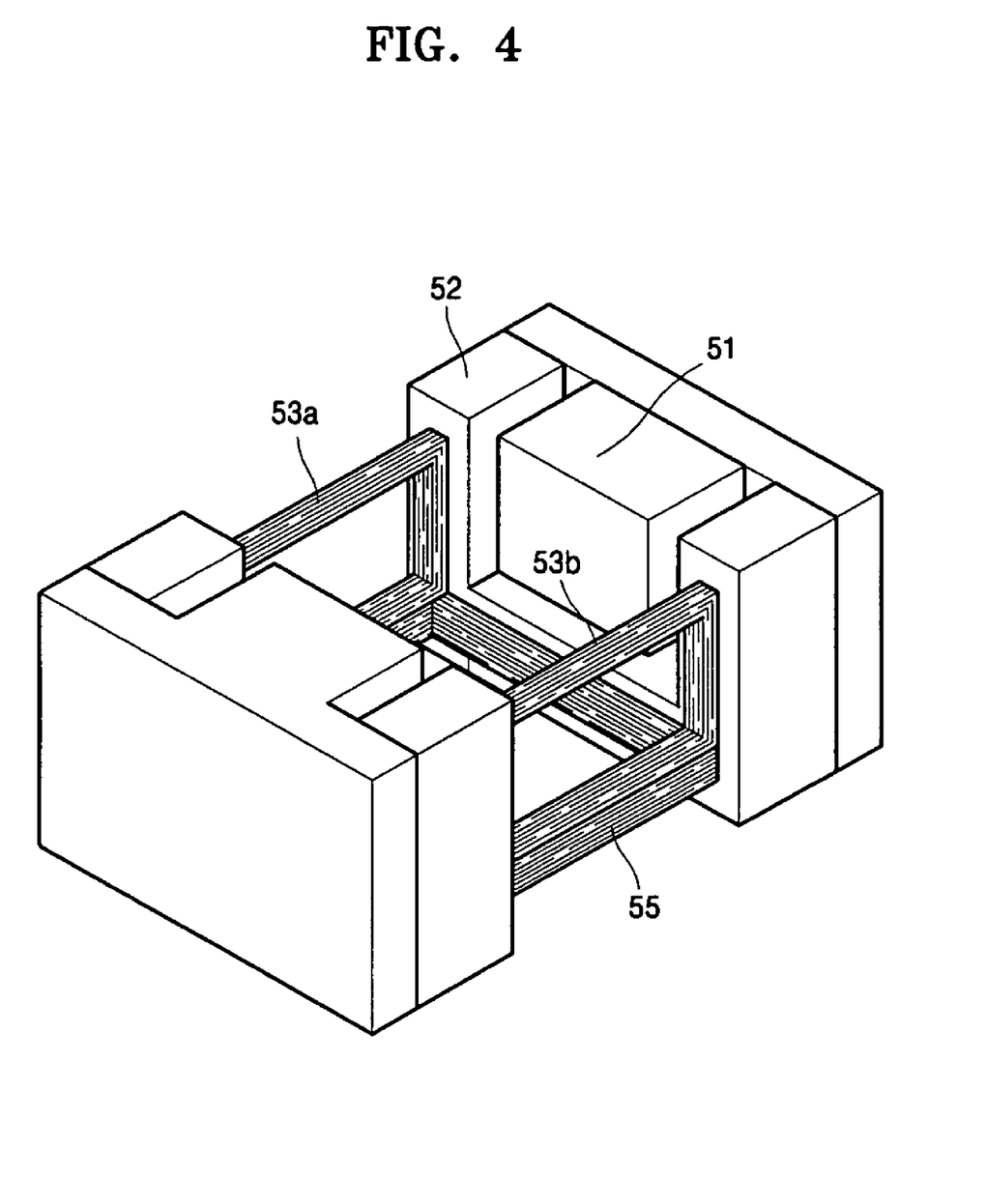
Figure 5A:
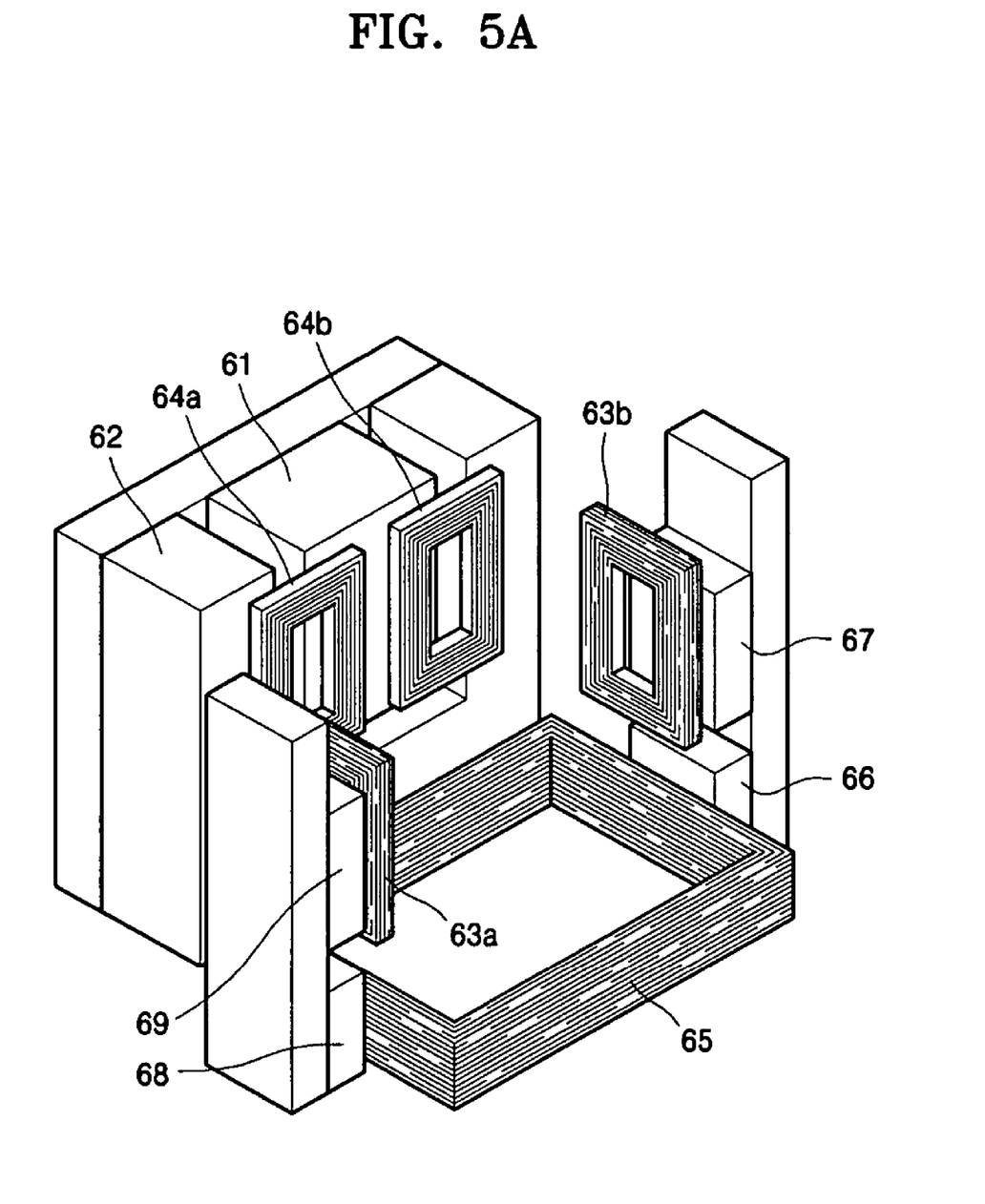
Figure 5B:
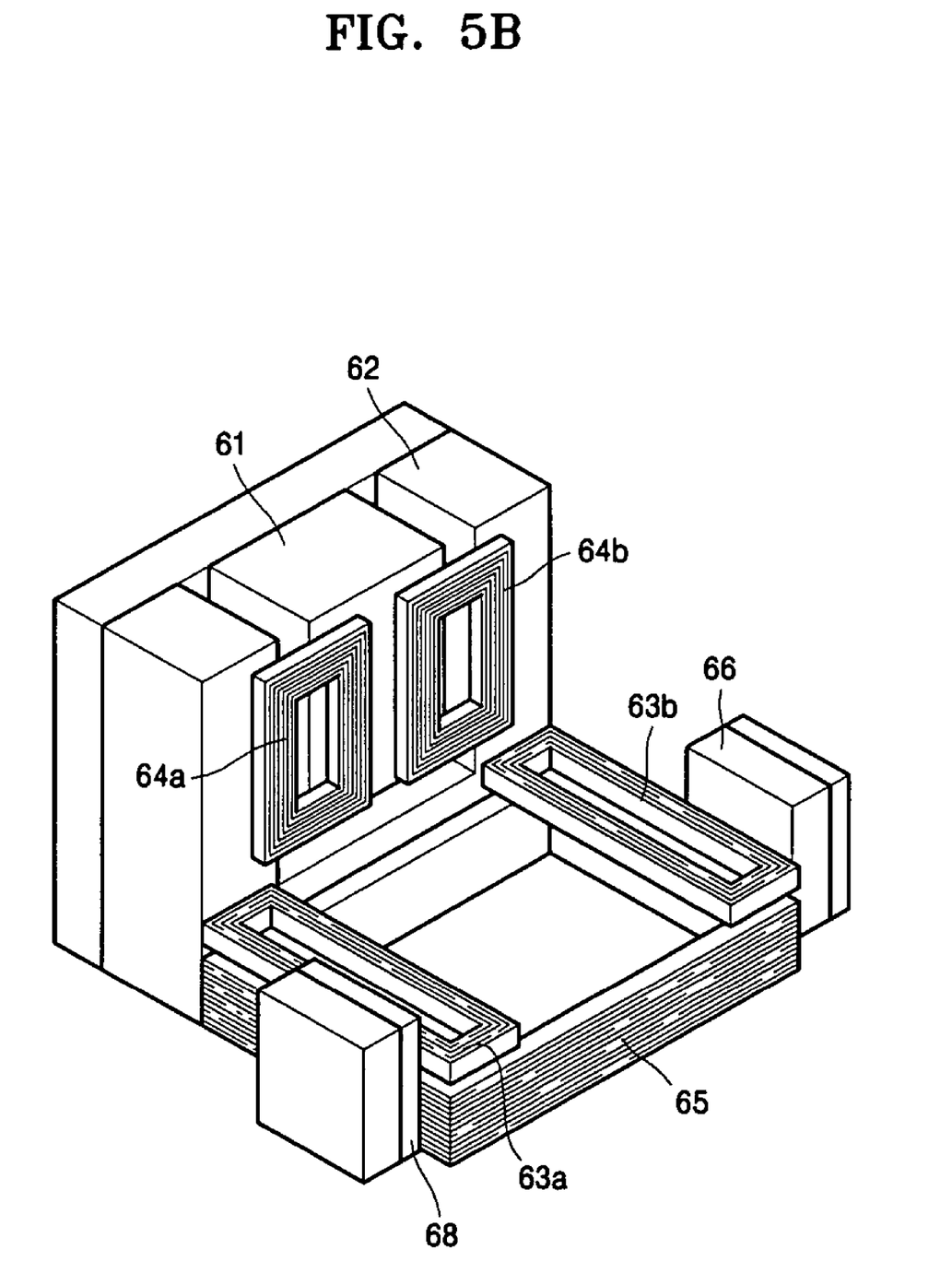
Figure 6:
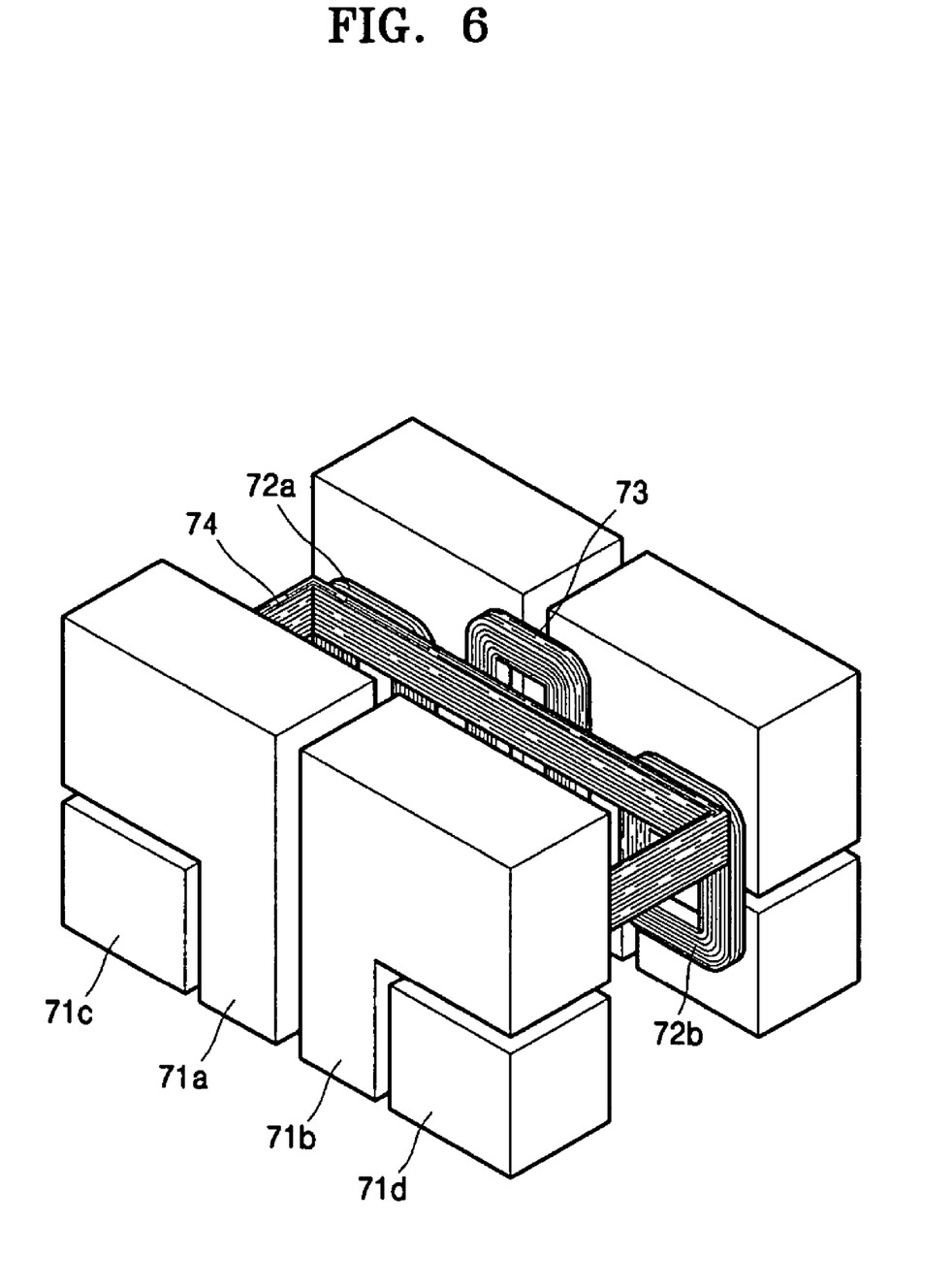

The aforementioned advantages of the magnetic driving units, according to embodiments of the present invention, can be more easily understood by a comparison with comparative examples of magnetic driving units shown in FIGS. 4 through 6.

In a magnetic driving unit for use in a high capacity media environment, e.g., with BD actuators, shown in FIG. 4, a second magnet 52 having a concave shape is disposed to surround three sides of a first magnet 51 having a rectangular shape to make up the magnet driving surface. Two tracking coils 53a and 53b are vertically installed along both edges of the second magnet 52, and a focusing coil 55 is horizontally installed on the lower portion of the second magnet 52. To drive a corresponding BD actuator in a tracking direction, magnetic fluxes generated from the polarized surfaces between the first and second magnets 51 and 52, on the illustrated right and left sides of the magnetic driving unit, are used. However, the magnetic driving unit of FIG. 4 has a problem in that tilt driving is not considered. A tilt coil for achieving tilt driving can be installed at a polarized surface between the bottom surface of the first magnet 51 and the concave surface of the second magnet 52. In this case, the tilt coil is located too close to the center of a lens holder, so a sufficient torque is not generated.

FIGS. 5A and 5B illustrate further magnetic driving units, each including a special structure for achieving tilt driving, solving the disadvantage of the magnetic driving unit of FIG. 4. In the magnetic driving unit of FIG. 5A, a second magnet 62 having a concave shape is disposed to surround three surfaces of a first magnet 61, which is rectangular, to make up the magnet driving surface and two sets of third and fourth magnets 66, 67, 68, and 69 are disposed on both sides of the magnet driving surface, e.g., in front of the first and second magnets 61 and 62. Tracking coils 64a and 64b are disposed to interact with magnetic fluxes generated from two polarized surfaces formed between the first and second magnets 61 and 62. A focusing coil 65 is disposed to interact with magnetic fluxes generated from the bottom portion of the second magnet 62 and the third magnets 66 and 68. Here, tilt coils 63a and 63b are disposed to interact with magnetic fluxes generated from the fourth magnets 67 and 69. Further, in the magnetic driving unit of FIG. 5B, the fourth magnets 67 and 69 of FIG. 5A have been omitted, and the tilt coils 63a and 63b are horizontally installed so that the third magnets 66 and 68 can drive a lens holder in a tilting direction.

The magnetic driving units illustrated in FIGS. 5A and 5B have very complicated structures and require an increased number of components, thereby increasing manufacturing costs and time. Furthermore, when the lens holder moves from side to side to perform a tracking operation, one of the tilt coils 63a and 63b will be closer to a corresponding magnet, and the other tilt coil will be farther from a corresponding magnet. At this moment, a natural tilt occurs. Hence, as illustrated with these embodiments, to adequately control the tilting operation becomes very difficult.

FIG. 6 illustrates another magnetic driving unit. In the magnetic driving unit of FIG. 6, the magnet driving surface includes a first magnet 71a and a second magnet 71b, adjacent to each other and having opposite polarities, and a third magnet 71c and a fourth magnet 71d symmetrically disposed along the outer edges of the first and second magnets 71a and 71b, respectively. Focusing coils 72a and 72b are vertically disposed along a polarized surface between the first and third magnets 71a and 71c and a polarized surface between the second and fourth magnets 71b and 71d, respectively. A tracking coil 73 is vertically disposed along a polarized surface between the first and second magnets 71a and 71b. Further, a tilt coil 74 may be horizontally disposed across upper portions of the first and second magnets 71a and 71b. However, in this example, the disposition of the focusing coils 72a and 72b along the polarized surfaces degrades the linearity of focusing driving.

With these examples in mind, reference is again made to the embodiments illustrated in FIGS. 2A, 2B, and 3, where the tilt coils 14a and 14b are disposed along the edges of the lens holder, such that a high thrust force can be generated. Also, since magnetic fluxes passing through the tilt coils 14a and 14b, upon tracking driving, are not changed, no natural tilt is generated. In addition, since focusing is driven using the non-polarized surface, e.g., only the non-polarized surface, between the third magnets 11, the linearity of focusing driving is good. Thus, the magnetic driving units illustrated FIGS. 2A, 2B, and 3, in some experiments, were found to obtain a thrust force of about 70 mN, which is greater than the thrust force of a conventional magnetic driving unit by nearly 40%. More specifically, a thrust force in the focusing direction was found to be about 76 mN, a thrust force in the tracking direction was found to be about 80 mN, and a thrust force in the tilting direction was found to be about 72 mN. Thus, according to an embodiment of the present invention, and due to such accomplishments, the magnetic driving units illustrated in FIGS. 2A, 2B, and 3 could be used to deal with, for example, 4x-speed or 6x-speed BDs or HD-DVDs.

Figure 7A:
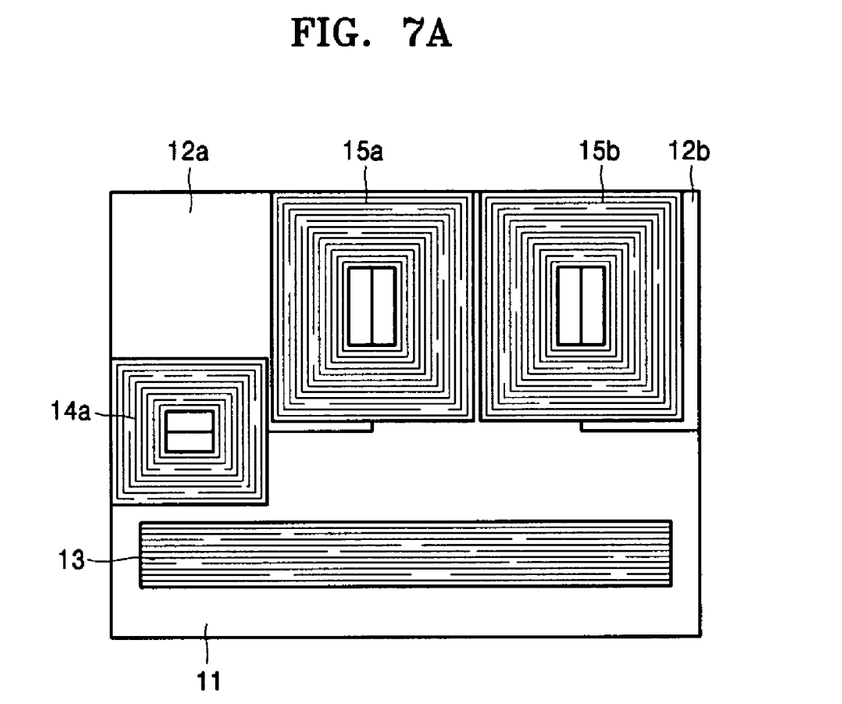
FIGS. 7A and 7B illustrate configurations of magnets and coils of a magnetic driving unit, e.g., in optical pickup actuators in recording and/or reproducing apparatuses, according to still further embodiments of the present invention.
Figure 7B:
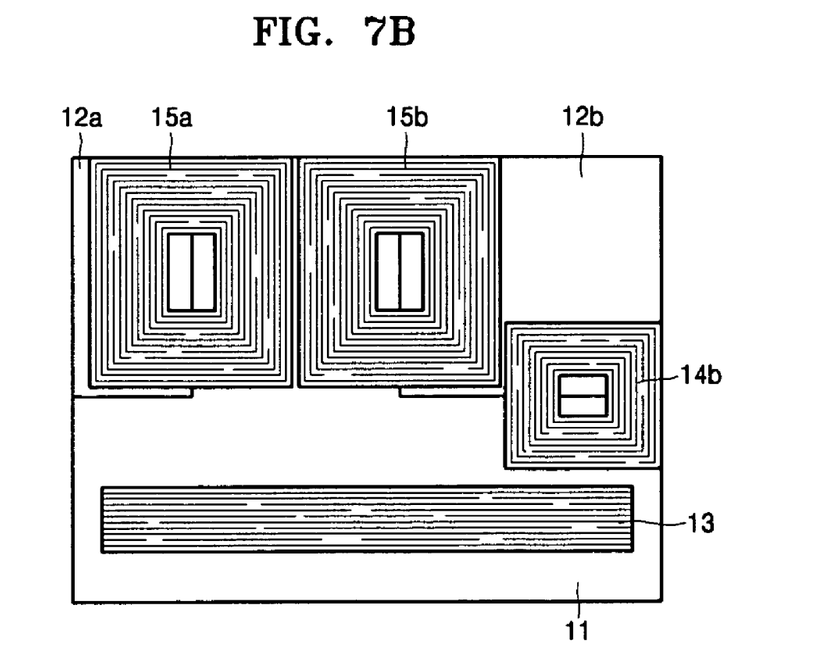

FIGS. 7A and 7B illustrate configurations of magnets and coils of a magnetic driving unit for optical pickup actuators, e.g., in a recording and/or reproducing apparatus, according to another embodiment of the present invention. In the magnetic driving units illustrated FIGS. 2A, 2B, and 3, the tilt coils 14a and 14b were disposed on the two second polarized surfaces of the magnet driving surface, respectively, and were formed between each of the first and second magnets 12a and 12b and a portion of the third magnet 11 which is below the first and second magnets 12a and 12b. However, according to the embodiment illustrated in FIGS. 7A and 7B, a single tilt coil may be disposed along one of the two second polarized surfaces. Here, it may be desirable that a polarized surface along which the single tilt coils is disposed is wider than the other polarized surface. In FIG. 7A, a width of the first magnetic 12a may be larger than that of the second magnet 12b. In a pickup actuator employing the magnetic driving unit illustrated FIG. 7A or 7B, since two magnetic driving units are symmetrically disposed along both sides of a lens holder, symmetrical tilt driving is also possible. The magnetic driving unit illustrated FIG. 7A or 7B can further be used when there is a need to improve the sensitivity of tracking driving rather than tilt driving, for example.

Figure 8:
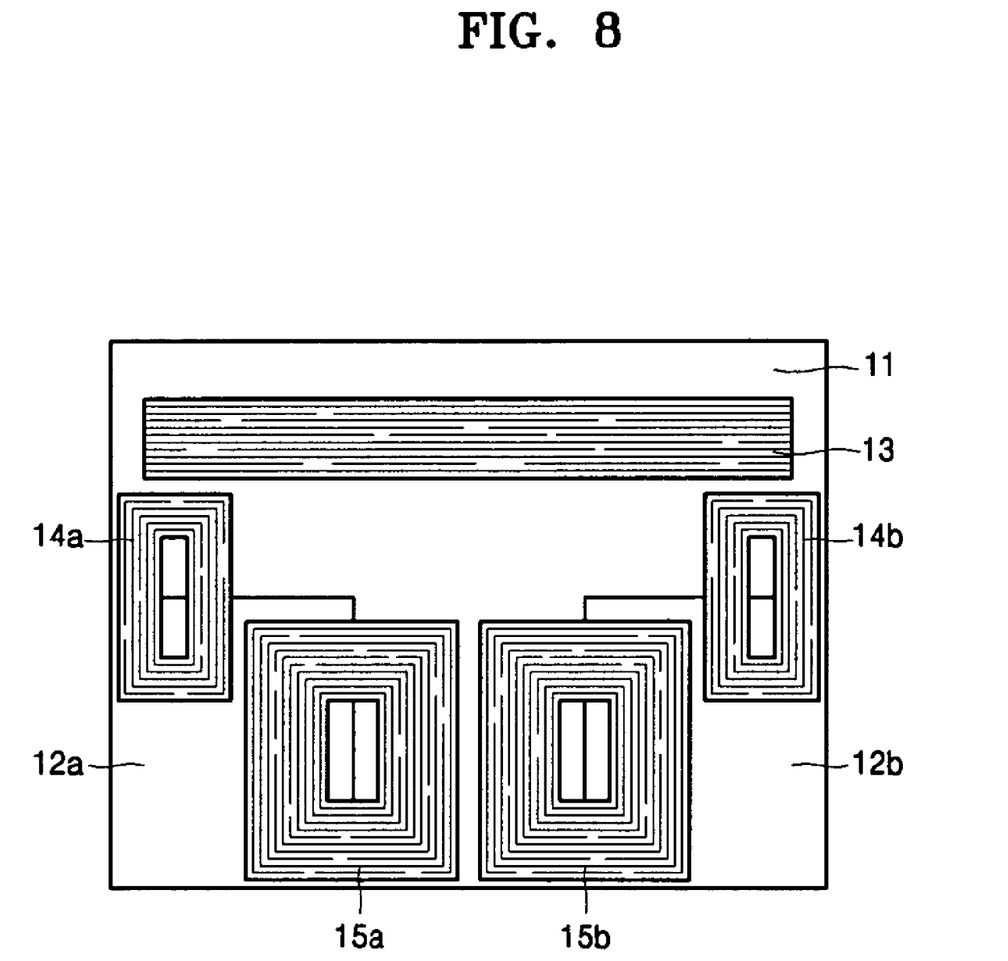
FIG. 8 illustrates a configuration of magnets and coils of a magnetic driving unit, in optical pickup actuators in recording and/or reproducing apparatuses, according to still another embodiment of the present invention.

FIG. 8 illustrates a configuration of magnets and coils of a magnetic driving unit in optical pickup actuator, e.g., in a recording and/or reproducing apparatus, according to still another embodiment of the present invention. The embodiment illustrated in FIG. 8 may be obtained by turning the illustration of the embodiment in FIGS. 2A and 2B upside down. That is, the third magnet 11 may be disposed to surround top surfaces of the first and second magnets 12a and 12b and the lateral surfaces thereof that face each other, thereby making up the magnet driving surface. The focusing coil 13 may be horizontally disposed along the upper portion of the surface-triple pole magnet driving surface. Thus, the focusing coil 13 may be wound around the upper portion of the lens holder.

Figure 9:
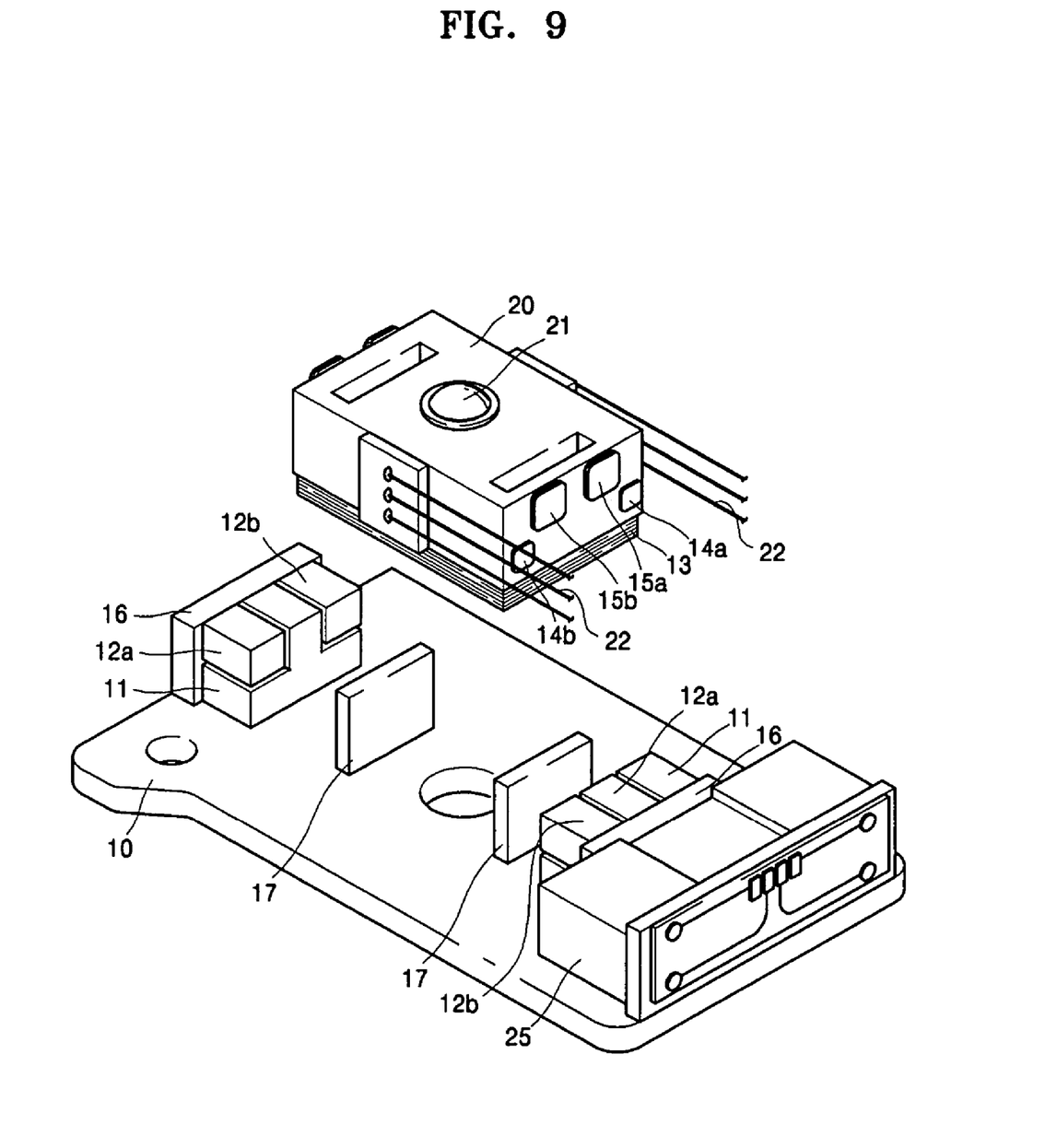
FIG. 9 illustrates an optical pickup actuator, e.g., in a recording and/or reproducing apparatus, according to an embodiment of the present invention.

FIG. 9 illustrates an optical pickup actuator, e.g., in a recording and/or reproducing apparatus, according to an embodiment of the present invention. As shown in FIG. 9, the optical pickup actuator may include a base 10, a lens holder 20 in which an objective lens 21 is installed, a plurality of suspension wires 22 each having one end coupled to the lens holder 20 so that the lens holder 20 can move over the base 10 and the other end coupled to a holder 25 installed on the base 10, and a magnetic driving unit for driving the lens holder 20 in a tracking direction, a focusing direction, and/or a tilt direction. The suspension wires 22 support the lens holder 20 and supply power to the plurality of coils of the magnetic driving unit.

The magnetic driving unit may be any one of the magnetic driving units illustrated in FIGS. 2A, 2B, 3, 7A, 7B, and 8, for example. For example, the optical pickup actuator of FIG. 9 may implement the magnetic driving units illustrated in FIGS. 2A through 3. Here, the magnets 11, 12a, and 12b of the magnetic driving unit may be installed on the base 10 and fixed onto the external yokes 16. The tilt coils 14a and 14b and the tracking coils 15a and 15b may be installed on either lateral side of the lens holder 20 such that the tilt coils 14a and 14b are symmetrical to each other and the tracking coils 15a and 15b are symmetrical to each other. The focusing coil 13 may be wound around the lower portion of the lens holder 20. Internal yokes 17 may be installed on the base 10 to guide a magnetic flux generated from the third magnet 11 toward the inside of the focusing coil 13.

Figure 10:
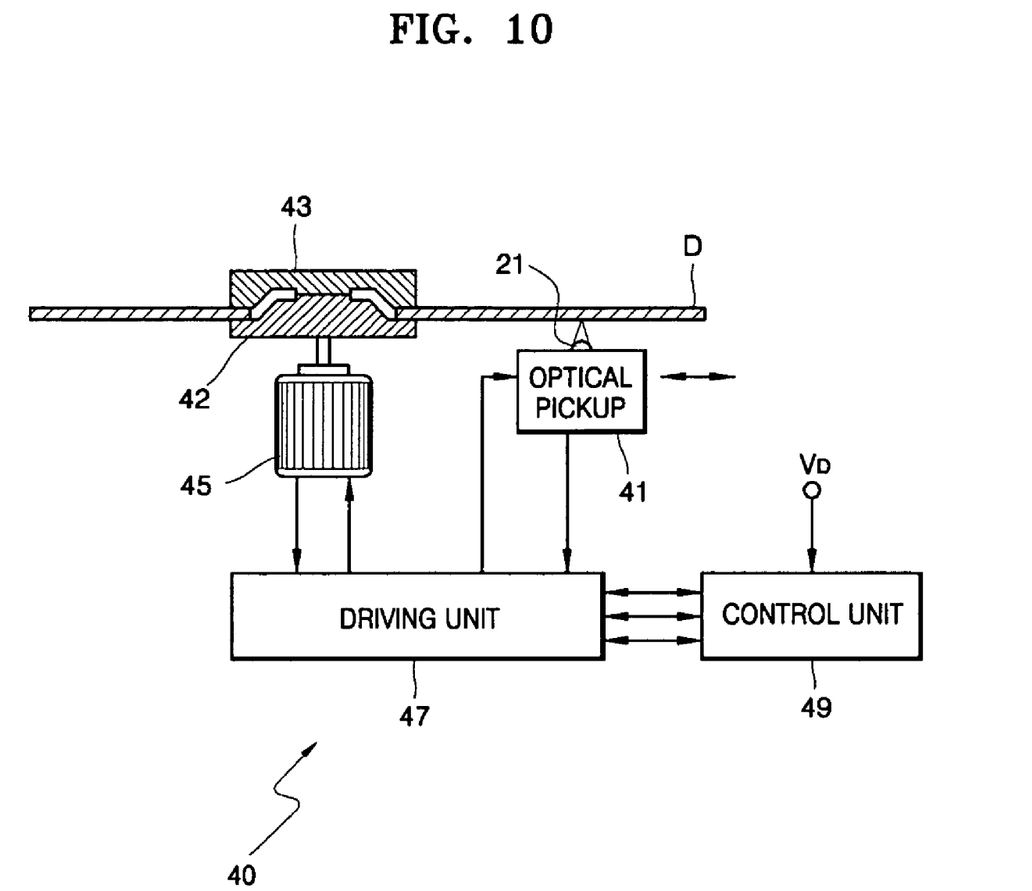
FIG. 10 illustrates a recording and/or reproducing apparatus employing an optical pickup actuator, such as that of FIG. 9, according to an embodiment of the present invention.

FIG. 10 further illustrates a recording and/or reproducing apparatus 40 employing an optical pickup actuator, such as that of FIG. 9, according to an embodiment of the present invention. As shown in FIG. 10, the optical recording and/or reproducing apparatus 40 may include a spindle motor 45 to rotate an optical information storage medium, namely, an optical disc D (e.g., CD, DVD, or BD), an optical pickup 41 movable in a radial direction of the optical disc D and recording and/or reproducing information to/from the optical disc D, a driving unit 47 driving the spindle motor 45 and the optical pickup 41, and a control unit 49 which controls tracking, focusing, and/or tilting servo of the optical pickup 41. Reference numeral 42 denotes a turntable, and reference numeral 43 denotes a clamp which chucks the optical disc D to the spindle motor 45 and turntable 42. The optical pickup 41 may include an optical system including an objective lens 21 for focusing light emitted from a light source (not shown) on the optical disc 20, and an optical pickup actuator for driving the objective lens 21. Here, according to an embodiment of the present invention, the optical pickup actuator may be the optical pickup actuator of FIG. 9, for example.

In an operation of the optical recording and/or reproducing apparatus 40, light reflected from the optical disc D is detected by a photodetector included in the optical pickup 41 and photoelectrically converted into an electrical signal. The electrical signal may be input to the control unit 49 via the driving unit 47, and the driving unit 47 may control a rotational speed of the spindle motor 45, amplify the input signal, and drive the optical pickup 41. The control unit 49 may transmit a focusing servo command, a tracking servo command, and/or a tilt servo command, which may be based on the signal input from the driving unit 47, to the driving unit 47, so as to perform a focusing servo operation, a tracking servo operation, and/or a tilt servo operation of the optical pickup 41.

In an optical recording/reproducing apparatus according to embodiments of the present invention, as at least described above, an optical pickup actuator has high thrust and provides high AC sensitivity, so that a focusing servo operation, a tracking servo operation, and/or a tilt servo operation can be very precisely controlled. Therefore, the optical recording and/or reproducing apparatus can record and/or reproduce information to/from BDs or HD-DVDs, for example, at a high speed of 4× or 6× or greater, also only as examples.

As described above, embodiments of the present invention set forth a magnetic driving unit having high thrust and high AC sensitivity compared with a conventional magnetic driving unit in an optical pickup actuator, e.g., in a recording and/or reproducing apparatus for high capacity recording medium, e.g., high-speed (4× or 6× speed) BDs or HD-DVDs. In an optical pickup actuator according to the present invention, focusing may be driven by using only a non-polarized surface of a magnet portion, and thus the linearity of the fusing driving is excellent. No natural tilt occurs upon tracking driving, and thus it is very easy to control tilt driving.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup actuator comprising:
   a lens holder to hold an objective lens, movably supported by a supporting unit; and
   a magnetic driving unit to drive the lens holder in a focusing direction, a tracking direction, and/or a tilting direction,
   wherein the magnetic driving unit comprises:
   a surface-triple pole magnet comprising a plurality of differently magnetized areas, formed by facing similarly magnetized sides of each of two respective first and second magnets with a respective differently magnetized side of a third magnet; and
   a coil portion comprising tracking coils and tilt coils disposed to interact with the differently magnetized areas of the surface-triple pole magnet portion and a focusing coil disposed to interact with a non-differently magnetized area of the surface-triple pole magnet,
   wherein the first, second, and third magnets are disposed in the a same plane.

2. The optical pickup actuator of claim 1, wherein the surface-triple pole magnet comprises:
   the third magnet having surfaces, of a polarity opposite to the polarity of the similarly magnetized sides of the first and second magnets, wherein a first portion of the third magnet is located interposed between the first and second magnets and forms two first differently magnetized areas along sides of the first portion that respectively face the similarly magnetized sides of the first and second magnets, and a second portion of the third magnet faces top sides or bottom sides of the first and second magnets, and forms two second differently magnetized areas along facing sides of the second portion.

3. The optical pickup actuator of claim 2, wherein the tracking coils comprise two tracking coils installed along two lateral sides of the lens holder to interact with the two respective first differently magnetized areas.

4. The optical pickup actuator of claim 2, wherein the tilt coils comprise two tilt coils installed along two lateral sides of the lens holder to interact with the two second differently magnetized areas, respectively.

5. The optical pickup actuator of claim 2, wherein a tilt coil is disposed on a lateral side of the lens holder to interact with one of the two second differently magnetized areas.

6. The optical pickup actuator of claim 5, wherein one second differently magnetized area, which interacts with the tilt coil, has a different width than another second differently magnetized area.

7. The optical pickup actuator of claim 2, wherein the focusing coil is installed on one of an upper portion and a lower portion of the lens holder so as to face the non-differently magnetized area of the third magnet.

8. The optical pickup actuator of claim 7, wherein the focusing coil is horizontally wound around the lens holder.

9. The optical pickup actuator of claim 7, further comprising inner yokes disposed within the lens holder to guide a magnetic flux generated from the third magnet inward of the focusing coil.

10. The optical pickup actuator of claim 2, wherein the first, second, and third magnets are symmetrically installed on opposite sides of the lens holder, the tracking coils are symmetrically installed on corresponding lateral surfaces of the lens holder, and the tilt coils are symmetrically installed on the corresponding lateral surfaces of the lens holder.

11. An optical pickup actuator comprising:
a lens holder to hold an objective lens, movably supported by a supporting unit; and
a magnetic driving unit to drive the lens holder in a focusing direction, a tracking direction, and/or a tilting direction,
wherein the magnetic driving unit comprises:
a surface-triple pole magnet comprising a plurality of differently magnetized areas, formed by facing sides of two magnets among three magnets; and
a coil portion comprising tracking coils and tilt coils disposed to interact with the differently magnetized areas of the surface-triple pole magnet and a focusing coil disposed to interact only with a non-differently magnetized area of the surface-triple pole magnet.

12. An optical recording/reproducing apparatus comprising:
an optical pickup comprising an objective lens to focus light emitted from a light source onto a medium and an optical pickup actuator to drive the objective lens, with the optical pickup being movable in a radial direction of the medium to record and/or reproduce information to/from the medium; and
a control unit to control servo of the optical pickup,
wherein the optical pickup actuator comprises:
a base;
a lens holder to hold the objective lens;
a supporting unit, having one end coupled to the lens holder and another end coupled to a holder installed on the base, so that the lens holder is moveable over the base; and
a magnetic driving unit to drive the lens holder in a focusing direction, a tracking direction, and/or a tilting direction,
wherein the magnetic driving unit comprises:
a surface-triple pole magnet comprising a plurality of differently magnetized areas, formed by facing similarly magnetized sides of each of two respective first and second magnets with a respective differently magnetized side of a third magnet; and
a coil portion comprising tracking coils and tilt coils disposed to interact with the differently magnetized areas of the surface-triple pole magnet portion and a focusing coil disposed to interact with a non-differently magnetized area of the surface-triple pole magnet.

13. The optical recording/reproducing apparatus of claim 12, wherein the surface-triple pole magnet comprises:
the first magnet and the second magnet being disposed in a plane; and
the third magnet having surfaces, of a polarity opposite to the polarity of the similarly magnetized sides of the first and second magnets, wherein a first portion of the third magnet is located interposed between the first and second magnets and forms two first differently magnetized areas along sides of the first portion that respectively face the similarly magnetized sides of the first and second magnets, and a second portion of the third magnet faces top sides or bottom sides of the first and second magnets, and forms two second differently magnetized areas along facing sides of the second portion.

14. The optical recording/reproducing apparatus of claim 13, wherein the tracking coils comprise two tracking coils installed along two lateral sides of the lens holder to interact with the two respective first differently magnetized areas.

15. The optical recording/reproducing apparatus of claim 13, wherein the tilt coils comprise two tilt coils installed along two lateral sides of the lens holder to interact with the two second differently magnetized areas, respectively.

16. The optical recording/reproducing apparatus of claim 13, wherein a tilt coil is disposed on a lateral side of the lens holder to interact with one of the two second differently magnetized areas.

17. The optical recording/reproducing apparatus of claim 16, wherein one second differently magnetized area, which interacts with the tilt coil, has a different width than another second differently magnetized area.

18. The optical recording/reproducing apparatus of claim 13, wherein the focusing coil is installed on at least one of an upper portion and a lower portion of the lens holder so as to face the non-differently magnetized area of the third magnet.

19. The optical recording/reproducing apparatus of claim 18, wherein the focusing coil is horizontally wound around the lens holder.

20. The optical recording/reproducing apparatus of claim 13, further comprising:
external yokes vertically installed on the base to fix the first, second, and third magnets; and
inner yokes vertically installed within the lens holder on the base to guide a magnetic flux generated from the third magnet inward of the focusing coil.

21. The optical recording/reproducing apparatus of claim 13, wherein the tracking coils are symmetrically installed on opposite lateral surfaces of the lens holder, the tilt coils are symmetrically installed on the corresponding lateral surfaces of the lens holder, and the first, second, and third magnets are symmetrically installed on corresponding sides of the lens holder such as to face the tracking coils and the tilt coils.

22. An optical recording/reproducing apparatus comprising:
an optical pickup comprising an objective lens to focus light emitted from a light source onto a medium and an optical pickup actuator to drive the objective lens, with the optical pickup being movable in a radial direction of the medium to record and/or reproduce information to/from the medium; and
a control unit to control servo of the optical pickup, wherein the optical pickup actuator comprises:

a base;

a lens holder to hold the objective lens;

a supporting unit, having one end coupled to the lens holder and another end coupled to a holder installed on the base, so that the lens holder is moveable over the base; and a magnetic driving unit to drive the lens holder in a focusing direction, a tracking direction, and/or a tilting direction, wherein the magnetic driving unit comprises:

a surface-triple pole magnet comprising a plurality of differently magnetized areas, formed by facing sides of two magnets among three magnets; and a coil portion comprising tracking coils and tilt coils disposed to interact with the differently magnetized areas of the surface-triple pole magnet and a focusing coil disposed to interact only with a non-differently magnetized area of the surface-triple pole magnet.

* * * * *

UNITED STATES PATENT AND TRADEMARK OFFICE
CERTIFICATE OF CORRECTION

PATENT NO. : 7,453,656 B2 Page 1 of 1
APPLICATION NO. : 11/385739
DATED : November 18, 2008
INVENTOR(S) : Dae-jong Jang et al.

It is certified that error appears in the above-identified patent and that said Letters Patent is hereby corrected as shown below:

Column 10, Line 50, change "the a" to --the--.

Signed and Sealed this

Twenty-fourth Day of February, 2009

JOHN DOLL
*Acting Director of the United States Patent and Trademark Office*